(12) United States Patent
Choi et al.

(10) Patent No.: US 9,468,889 B2
(45) Date of Patent: Oct. 18, 2016

(54) EXHAUST GAS TREATMENT SYSTEM

(71) Applicant: Hyundai Motor Company, Seoul (KR)

(72) Inventors: Sungmu Choi, Seongnam-Si (KR); Hyokyung Lee, Anyang-Si (KR)

(73) Assignee: Hyundai Motor Company, Seoul (KR)

( * ) Notice: Subject to any disclaimer, the term of this patent is extended or adjusted under 35 U.S.C. 154(b) by 137 days.

(21) Appl. No.: 14/330,828

(22) Filed: Jul. 14, 2014

(65) Prior Publication Data

US 2015/0017069 A1   Jan. 15, 2015

(30) Foreign Application Priority Data

Jul. 15, 2013   (KR) .................. 10-2013-0083080

(51) Int. Cl.
  *B01D 53/94*   (2006.01)
  *F01N 3/08*    (2006.01)
  *F01N 9/00*    (2006.01)
  *F01N 3/021*   (2006.01)
  *F01N 13/00*   (2010.01)

(52) U.S. Cl.
  CPC ....... *B01D 53/9495* (2013.01); *B01D 53/9477* (2013.01); *F01N 3/021* (2013.01); *F01N 3/0814* (2013.01); *F01N 3/0821* (2013.01); *F01N 3/0842* (2013.01); *F01N 3/0864* (2013.01); *F01N 9/00* (2013.01); *F01N 13/009* (2014.06); *B01D 53/944* (2013.01); *B01D 53/9422* (2013.01); *B01D 2255/2065* (2013.01); *B01D 2255/908* (2013.01); *B01D 2255/9155* (2013.01); *B01D 2258/012* (2013.01); *F01N 2430/06* (2013.01); *F01N 2560/025* (2013.01); *F01N 2560/06* (2013.01); *F01N 2560/14* (2013.01); *F01N 2900/0422* (2013.01); *F01N 2900/1614* (2013.01); *Y02T 10/47* (2013.01)

(58) Field of Classification Search
  CPC ........... F01N 13/009; F01N 2255/908; F01N 2560/14; F01N 2258/012; F01N 2900/1614; F01N 3/0814
  USPC ................................ 422/168, 169, 177, 180
  See application file for complete search history.

(56) References Cited

U.S. PATENT DOCUMENTS

2002/0007629 A1\* 1/2002 Asanuma ................ F01N 3/023
                                                    60/297
2007/0101701 A1\* 5/2007 Acke .................. B01D 53/9431
                                                    60/286

FOREIGN PATENT DOCUMENTS

JP    2006-046252 A    2/2006
JP       3904768       4/2007
KR    10-892538 B1     4/2009

\* cited by examiner

*Primary Examiner* — Tom P Duong
(74) *Attorney, Agent, or Firm* — McDermott Will & Emery LLP

(57) ABSTRACT

An exhaust gas treatment system includes an exhaust line through which exhaust gas flows. A nitrogen oxide purification catalyst is disposed at one side of the exhaust line to reduce the nitrogen oxide. A diesel particulate filter is disposed at a downstream side of the nitrogen oxide purification catalyst, filters a particulate material, and eliminates the material in a set condition, wherein a set amount of oxygen storage material is included in the diesel particulate filter.

7 Claims, 8 Drawing Sheets

EXHAUST GAS TREATMENT SYSTEM

CROSS-REFERENCE TO RELATED APPLICATION

This application claims the benefit of priority to Korean Patent Application No. 10-2013-0083080 filed in the Korean Intellectual Property Office on Jul. 15, 2013, the entire contents of which are incorporated herein by reference.

TECHNICAL FIELD

The present disclosure is related to an exhaust gas treatment system that includes a nitrogen oxide purification catalyst (LNT) absorbing and reducing to eliminate nitrogen oxide (NOx) and a diesel particulate filter trapping a particulate material and burning to eliminate the particulate material.

BACKGROUND

Generally, a nitrogen oxide purification catalyst is disposed on an exhaust line to reduce nitrogen oxide (NOx) of exhaust gas, and alkali metals or alkali earth metals are formed therein together with a noble metal.

The nitrogen oxide purification catalyst absorbs NOx in a lean condition of exhaust gas, discharges NOx in a rich condition of exhaust gas, and reduces the discharged NOx.

The intake air amount can be reduced or the exhaust gas can be recirculated so as to regenerate or desulfurize the nitrogen oxide purification catalyst. The lean/rich condition of exhaust gas can be controlled by controlling the injection timing or the injection amount of fuel that is injected into a cylinder.

A lambda sensor (or oxygen sensor) is disposed on an exhaust line so as to control the lean/rich condition of exhaust gas, and the lean/rich condition of exhaust gas is detected through a lambda signal that is transmitted from the sensor.

A rich mode is performed to control the exhaust gas to the rich condition so as to reduce the NOx that is absorbed in the nitrogen oxide purification catalyst while the rich mode is performed, and to reduce oxygen that is stored in the nitrogen oxide purification catalyst. A diesel particulate filter is decreased, and the nitrogen oxide that is absorbed in the nitrogen oxide purification catalyst is released to be reduced.

Hydrocarbon and carbon monoxide that are included in the exhaust gas are not oxidized at an end stage of the rich mode, the amount that is exhausted to an outside is increased, and the rich mode is not sufficiently continued by the lambda signal that is generated from the lambda sensor.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an exhaust gas treatment system having advantages of sufficiently releasing nitrogen oxide trapped in a nitrogen oxide purification catalyst, reducing the same, and simultaneously, effectively decreasing hydrocarbon and carbon monoxide that are exhausted.

An exhaust gas treatment system according to an exemplary embodiment of the present disclosure may include an exhaust line through which exhaust gas flows. A nitrogen oxide purification catalyst is disposed at one side of the exhaust line to reduce the nitrogen oxide. A diesel particulate filter is disposed at a downstream side of the nitrogen oxide purification catalyst, filters a particulate material, and eliminates the material in a set condition. A set amount of oxygen storage material is included in the diesel particulate filter.

The oxygen storage material may include cerium oxide.

The oxygen storage material may occupy above 50% or 10 gram of a catalyst component of the diesel particulate filter.

The exhaust gas treatment system may include a first lambda sensor that is disposed at an upstream side of the nitrogen oxide purification catalyst to generate a lambda signal depending on a lean/rich condition of the exhaust gas. A second lambda sensor is disposed at a downstream side of the diesel particulate filter to generate a lambda signal depending on the lean/rich condition of the exhaust gas.

The oxygen that is stored in the oxygen storage material of the diesel particulate filter may oxidize hydrocarbon and carbon monoxide that are discharged from the nitrogen oxide purification catalyst, while the exhaust gas flowing into the nitrogen oxide purification catalyst maintains a rich condition.

The exhaust gas treatment system may include a controller that is configured to control the lean/rich condition of the exhaust gas flowing thorough the exhaust line.

The controller may control the exhaust gas to a rich condition so as to eliminate nitrogen oxide that is absorbed in the nitrogen oxide purification catalyst and return the exhaust gas to a lean condition depending on lambda signal values that are transmitted from the first lambda sensor and the second lambda sensor.

The controller may control the exhaust gas to a rich condition so as to eliminate nitrogen oxide that is absorbed in the nitrogen oxide purification catalyst and return the exhaust gas to a lean condition depending on an oxygen storage amount and a nitrogen oxide absorption amount.

The controller may control the exhaust gas to a rich condition so as to eliminate nitrogen oxide that is absorbed in the nitrogen oxide purification catalyst and return the exhaust gas to the lean condition after a set period of time elapses.

As described above, in an exhaust gas treatment system according to an exemplary embodiment of the present disclosure, an oxygen storage material is formed in a diesel particulate filter that is disposed at a downstream side of a nitrogen oxide purification catalyst, such that an exhaust amount of carbon monoxide, hydrocarbon, and nitrogen oxide which is absorbed in the nitrogen oxide purification catalyst is sufficiently eliminated, and the purification rate of the nitrogen oxide can be improved.

DETAILED DESCRIPTION OF THE EMBODIMENTS

An exemplary embodiment of the present disclosure will hereinafter be described in detail with reference to the accompanying drawings.

Figure 1:
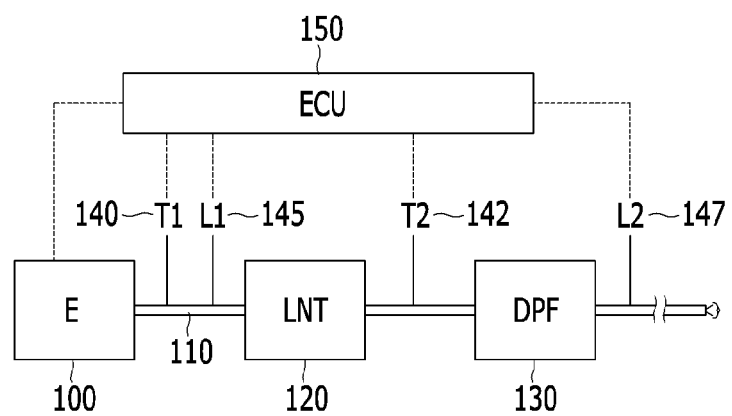
FIG. 1 is a schematic diagram of an exhaust gas treatment system according to an exemplary embodiment of the present disclosure.

FIG. 1 is a schematic diagram of an exhaust gas treatment system according to an exemplary embodiment of the present disclosure.

Referring to FIG. 1, an exhaust gas treatment system includes an engine 100, an exhaust line 110, a nitrogen oxide purification catalyst 120, a diesel particulate filter 130, a first temperature sensor 145, a second temperature sensor 147, a first lambda sensor 140, a second lambda sensor 142, and a controller 150.

The engine 100 generates power and releases exhaust gas, and the exhaust line 110 discharges the exhaust gas that is generated from the engine 100.

The nitrogen oxide purification catalyst 120 and the diesel particulate filter 130 are sequentially disposed on the exhaust line 110, and the first temperature sensor 145 and the first lambda sensor 140 are disposed at an upstream side of the nitrogen oxide purification catalyst 120.

The second temperature sensor 147 is disposed between the nitrogen oxide purification catalyst 120 and the diesel particulate filter 130, and the second lambda sensor 142 is disposed at a downstream side of the diesel particulate filter 130.

The first temperature sensor 145 and the second temperature sensor 147 detects temperature of exhaust gas, and the first lambda sensor 140 and the second lambda sensor 142 detects a lean/rich condition of exhaust gas through an oxygen concentration.

The controller 150 uses a signal that is generated from the first/second temperature sensor 145/147 and a signal that is generated from the first/second lambda sensor 140/142 to control the engine 100, and control the lean/rich condition and a temperature of the exhaust gas passing the exhaust line 110.

The controller 150 controls the exhaust gas to the lean condition such that the nitrogen oxide purification catalyst 120 absorbs nitrogen oxide in a set condition and controls the exhaust gas to the rich condition, such that the nitrogen oxide purification catalyst 120 discharges nitrogen oxide to be reduced in another condition.

The diesel particulate filter 130 filters a particulate material passing the exhaust line 110, burns the material in a set condition, and oxidizes hydrocarbon and carbon monoxide that are exhausted from the engine 100 and the nitrogen oxide purification catalyst 120.

In an exemplary embodiment of the present disclosure, the diesel particulate filter 130 includes oxygen storage material that can store oxygen of a predetermined amount in the lean condition of exhaust gas. The oxygen storage material can include cerium and the cerium occupies larger than 50% or 10 g in a catalyst component.

The nitrogen oxide that is exhausted from the nitrogen oxide purification catalyst 120 reacts with oxygen that is stored in the diesel particulate filter 130 to be reduced, such that the rich time of exhaust gas is increased, a purification rate of the overall nitrogen oxide is increased, and the purification rate of hydrocarbon and carbon monoxide can be uniformly maintained.

Figure 2:
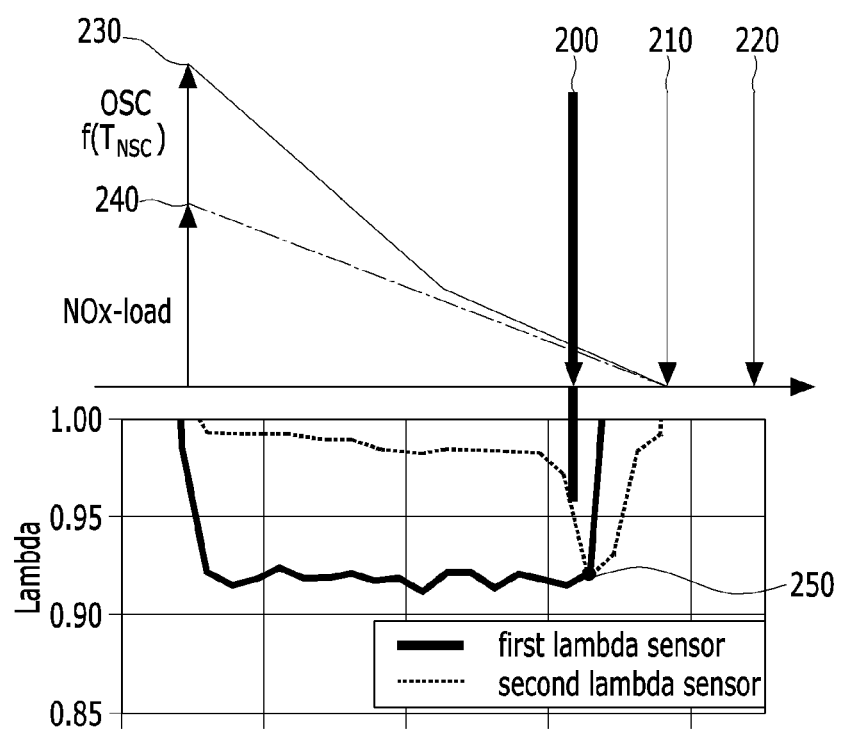
FIG. 2 is a graph showing an oxygen storage amount, a nitrogen oxide absorption amount, and a lambda value along time in an exhaust gas treatment system according to an exemplary embodiment of the present disclosure.

FIG. 2 is a graph showing an oxygen storage amount, nitrogen oxide absorption amount, and lambda values along time in an exhaust gas treatment system according to an exemplary embodiment of the present disclosure.

Referring to FIG. 2, in an upper side of a graph, a horizontal axis denotes time, and a vertical axis denotes a nitrogen oxide absorption amount and an oxygen storage amount. Here, the nitrogen oxide storage amount line 240 denotes a nitrogen oxide storage amount that is stored in the nitrogen oxide purification catalyst 120, and the oxygen storage amount line 230 denotes the oxygen storage amount that is stored in the nitrogen oxide purification catalyst 120 and the diesel particulate filter 130.

In a lower side of the graph, a horizontal axis denotes time, and a vertical axis denotes lambda values (lean/rich condition) of the first lambda sensor 140 and the second lambda sensor 142.

If the controller 150 controls the exhaust gas to a rich condition, the lambda value of the first lambda sensor 140 decreases, time elapses, and the lambda value of the second lambda sensor 142 decreases to form a crossing point 250 in which the lambda value crosses.

If a rich control is terminated through the lambda value, the rich control ends at a first point 20, and if the rich control is terminated through the nitrogen oxide storage amount and the oxygen storage amount, the rich control ends at a second point 210 that is later than the first point 200. And, if the rich control is terminated after a set period of time, the rich control ends at a third point 220.

In an exemplary embodiment of the present disclosure, the nitrogen oxide storage amount line 240 and the oxygen storage amount line 230 can be stored in a predetermined data, and the rich and lean control can be performed by the data.

Figure 3:
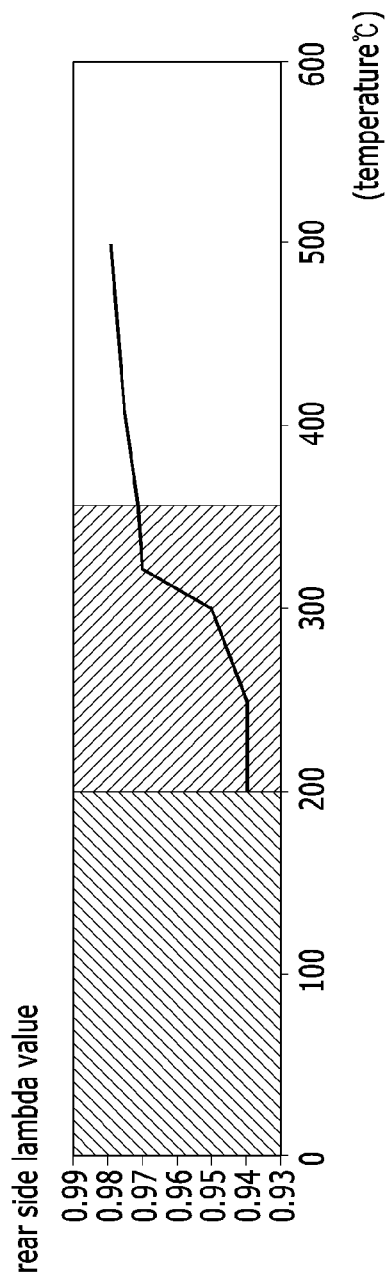
FIG. 3 is a graph showing a lambda value along temperature in an exhaust gas treatment system according to an exemplary embodiment of the present disclosure.

FIG. 3 is a graph showing a lambda value along temperature in an exhaust gas treatment system according to an exemplary embodiment of the present disclosure.

Referring to FIG. 3, a horizontal axis denotes temperature of exhaust gas and a vertical axis denotes a lambda value of the second lambda sensor 142.

The nitrogen oxide purification catalyst 120 is not regenerated under 200 degrees Celsius, and the catalyst 120 is regenerated by an unloading model under about 350 degrees Celsius. Here, the unloading model denotes performing the rich control through data of the nitrogen oxide storage amount line 240 and the oxygen storage amount line 230.

The regeneration of the nitrogen oxide purification catalyst 120 is performed through the lambda value that is generated from the first and second lambda sensor 140 and 142 above about 350 degrees Celsius.

Figure 4:
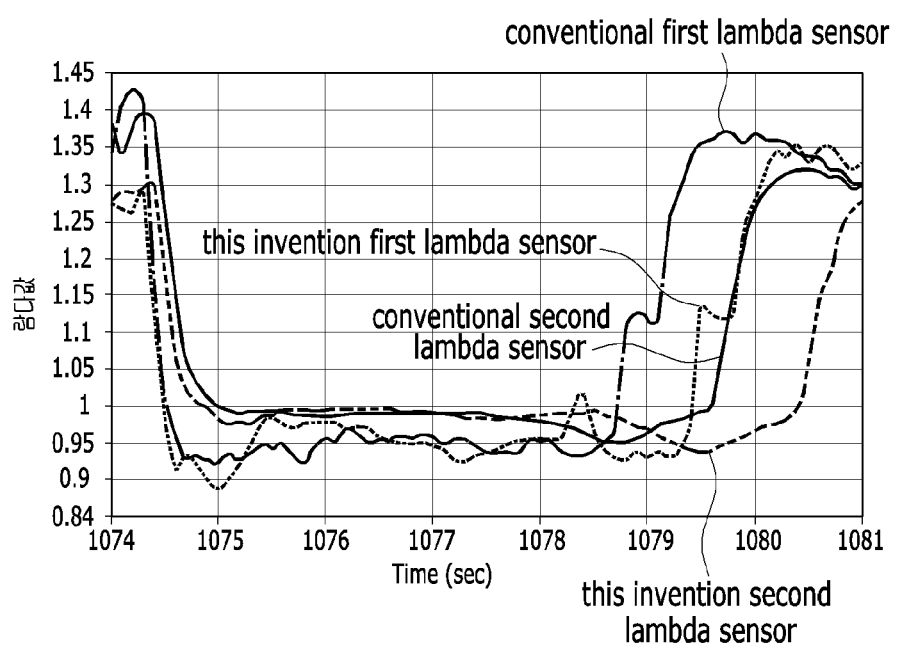
FIG. 4 is a graph showing effect and lambda value along time in an exhaust gas treatment system according to an exemplary embodiment of the present disclosure.

FIG. 4 is a graph showing an effect and a lambda value along time in an exhaust gas treatment system according to an exemplary embodiment of the present disclosure.

Referring to FIG. 4, a horizontal axis denotes time, and a vertical axis denotes lambda values. If the lambda value of a conventional first lambda sensor is compared with the first lambda sensor 140 of the present disclosure, it can be known that the rich duration time of the first lambda sensor 140 is increased.

Further, if the lambda value of a conventional second lambda sensor is compared with the second lambda sensor 142 of the present disclosure, it can be known that the rich duration time of the second lambda sensor 142 is increased.

Figure 5:
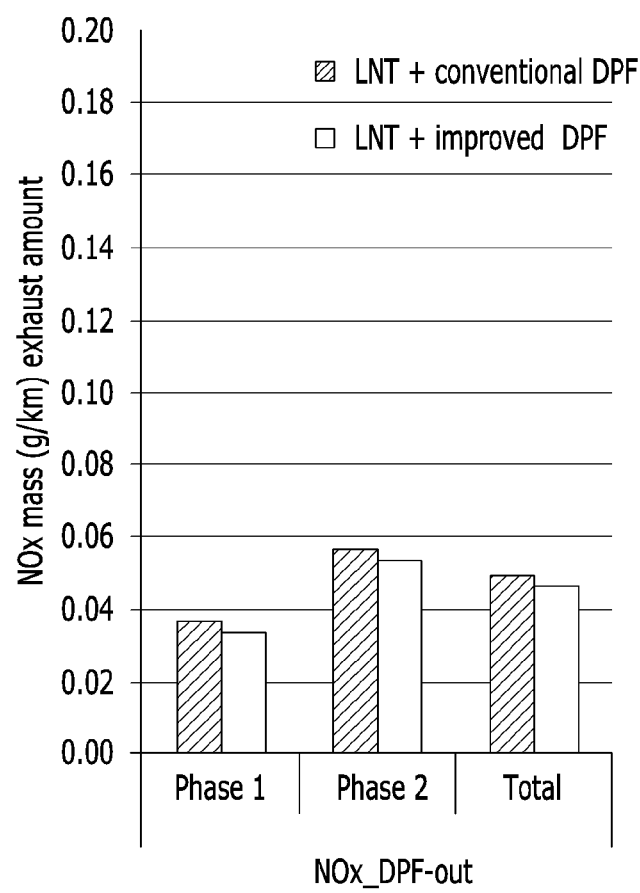
FIG. 5 is a graph showing an exhaust amount and an effect in an exhaust gas treatment system according to an exemplary embodiment of the present disclosure.

FIG. 5 is a graph showing exhaust amount and effects in an exhaust gas treatment system according to an exemplary embodiment of the present disclosure.

Referring to FIG. 5, a horizontal axis denotes each driving condition, a vertical axis denotes exhaust amount of nitrogen oxide that is exhausted through an exhaust line. The diesel particulate filter 130 reduces the exhaust amount of nitrogen oxide, compared with a conventional diesel particulate filter.

Figure 6:
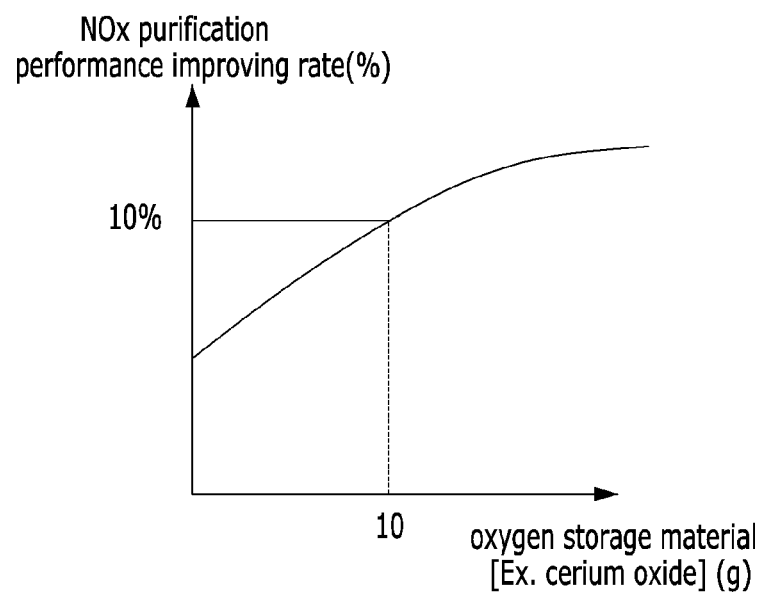
FIG. 6 is a graph showing a purification rate improving effect of nitrogen oxide and oxygen material amount in an exhaust gas treatment system according to an exemplary embodiment of the present disclosure.

FIG. 6 is a graph showing a purification rate improving an effect of nitrogen oxide and oxygen material amount in an exhaust gas treatment system according to an exemplary embodiment of the present disclosure.

Referring to FIG. 6, a horizontal axis denotes a mass of oxygen storage material, and a vertical axis denotes a purification rate % of nitrogen oxide. As shown in a drawing, as the amount of the oxygen storage material is increased, it can be known that the purification rate is increased.

Figure 7:
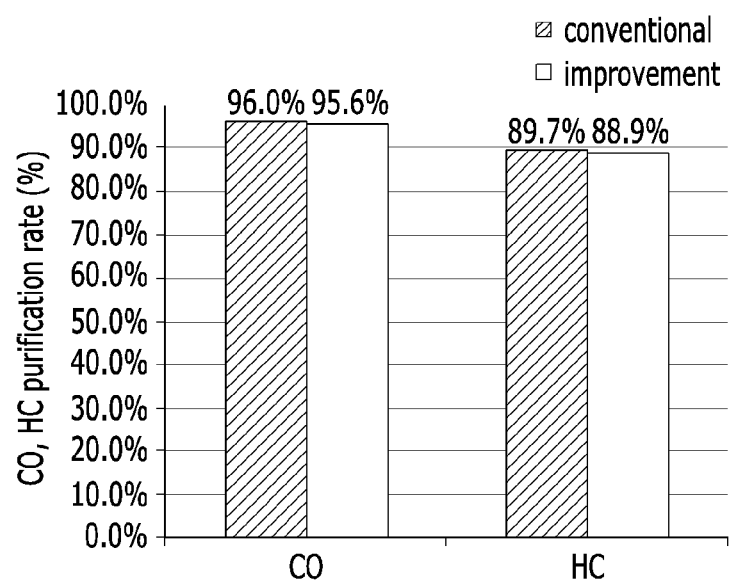
FIG. 7 is a graph showing a purification rate of harmful gas in an exhaust gas treatment system according to an exemplary embodiment of the present disclosure.

FIG. 7 is a graph showing purification rate of harmful gas in an exhaust gas treatment system according to an exemplary embodiment of the present disclosure.

Referring to FIG. 7, a horizontal axis denotes carbon monoxide and hydrocarbon, and a vertical axis denotes purification rate % of carbon monoxide and hydrocarbon. As shown in a drawing, conventional purification rates and improved purification rates show an equal level.

Figure 8:
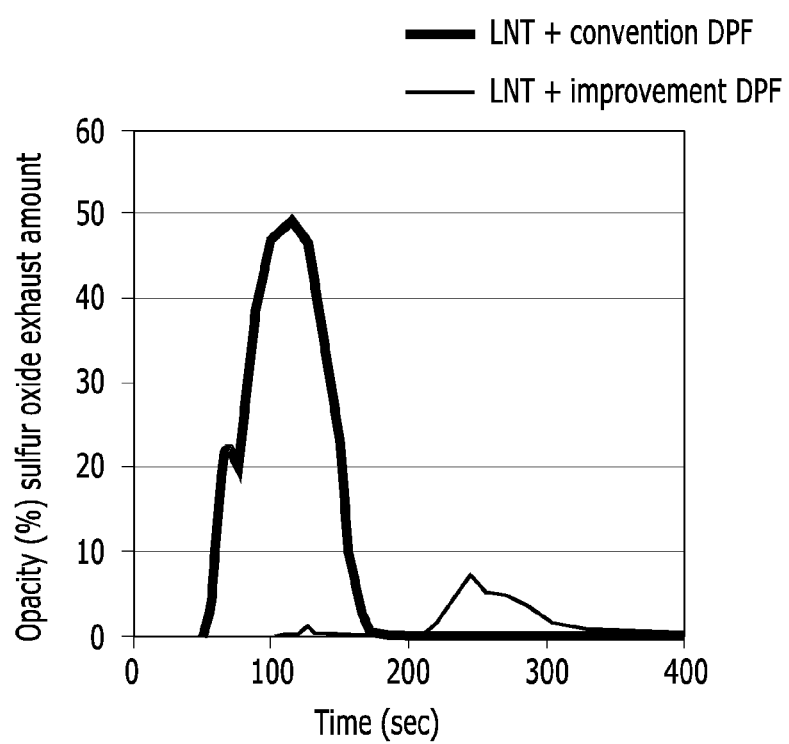
FIG. 8 is a graph showing a sulfur oxide exhaust amount along time in an exhaust gas treatment system according to an exemplary embodiment of the present disclosure.

FIG. 8 is a graph showing sulfur oxide exhaust amount along time in an exhaust gas treatment system according to an exemplary embodiment of the present disclosure.

Referring to FIG. 8, a horizontal axis denotes elapsed time after a rich mode starts, and a vertical axis denotes exhaust amount % of sulfur compound. In the conventional art, larger amount of sulfur compound is generated in a predetermined section, but the amount of the sulfur compound is decreased in the present disclosure, and it can be identified that white smoke is reduced.

While this disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. An exhaust gas treatment system, comprising:
    an exhaust line through which exhaust gas flows;
    a nitrogen oxide purification catalyst that is disposed at one side of the exhaust line to reduce nitrogen oxide;
    a diesel particulate filter that is disposed at a downstream side of the nitrogen oxide purification catalyst, filters a particulate material, and eliminates the particulate material in a set condition; and
    a controller that is configured to control a lean/rich condition of the exhaust gas flowing thorough the exhaust line,
    wherein a set amount of an oxygen storage material is included in the diesel particulate filter, and
    wherein the controller is configured to control the exhaust gas to a rich condition to eliminate nitrogen oxide that is absorbed in the nitrogen oxide purification catalyst and configured to return the exhaust gas to a lean condition depending on an oxygen storage amount and a nitrogen oxide absorption amount.

2. The exhaust gas treatment system of claim 1, wherein the oxygen storage material includes cerium oxide.

3. The exhaust gas treatment system of claim 1, wherein the oxygen storage material occupies more than 50% or 10 gram of a catalyst component of the diesel particulate filter.

4. The exhaust gas treatment system of claim 1, comprising:
    a first lambda sensor that is disposed at an upstream side of the nitrogen oxide purification catalyst to generate a lambda signal depending on the lean/rich condition of the exhaust gas; and
    a second lambda sensor that is disposed at a downstream side of the diesel particulate filter to generate a lambda signal depending on the lean/rich condition of the exhaust gas.

5. The exhaust gas treatment system of claim 1, wherein oxygen that is stored in the oxygen storage material of the diesel particulate filter oxidizes hydrocarbon and carbon monoxide that are discharged from the nitrogen oxide purification catalyst, while the exhaust gas flowing into the nitrogen oxide purification catalyst maintains the rich condition.

6. The exhaust gas treatment system of claim 1, wherein the controller controls the exhaust gas to a rich condition so as to eliminate the nitrogen oxide that is absorbed in the nitrogen oxide purification catalyst and returns the exhaust gas to the lean condition depending on lambda signal values that are transmitted from the first lambda sensor and the second lambda sensor.

7. The exhaust gas treatment system of claim 1, wherein the controller controls the exhaust gas to a rich condition so as to eliminate nitrogen oxide that is absorbed in the nitrogen oxide purification catalyst and returns the exhaust gas to the lean condition after a set period of time elapses.

* * * * *